(12) United States Patent
Sugimoto et al.

(10) Patent No.: US 6,847,402 B2
(45) Date of Patent: Jan. 25, 2005

(54) IMAGING APPARATUS HAVING AUTOFOCUS FUNCTION

(75) Inventors: Kazuhiko Sugimoto, Shijonawate (JP); Kenichi Kikuchi, Kawanishi (JP)

(73) Assignee: Sanyo Electric Co., Ltd., Osaka (JP)

( * ) Notice: Subject to any disclaimer, the term of this patent is extended or adjusted under 35 U.S.C. 154(b) by 730 days.

(21) Appl. No.: 09/799,040

(22) Filed: Mar. 6, 2001

(65) Prior Publication Data

US 2001/0028402 A1 Oct. 11, 2001

(30) Foreign Application Priority Data

Mar. 8, 2000 (JP) ........................................ 2000-063770

(51) Int. Cl.$^7$ ............................................... G03B 13/00
(52) U.S. Cl. ..................................... 348/354; 348/349
(58) Field of Search ................................ 348/354, 355, 348/356, 349; 250/201.2, 201.4

(56) References Cited

U.S. PATENT DOCUMENTS 4,967,280 A  * 10/1990 Takuma et al. ............. 348/355
5,093,716 A  * 3/1992 Kondo et al. ............ 348/224.1
6,512,549 B1 * 1/2003 Iijima et al. ................ 348/349

FOREIGN PATENT DOCUMENTS

JP          3-68280         3/1991

* cited by examiner

Primary Examiner—Andrew Christensen
Assistant Examiner—Brian Jelinek
(74) Attorney, Agent, or Firm—Armstrong, Kratz, Quintos, Hanson & Brooks, LLP

(57) ABSTRACT

A still camera utilizes a focus evaluation value based on an imaging video signal to execute an autofocus operation by a hill-climbing control method. A CPU divides a focus area into a plurality of regions to obtain a focus evaluation value from a digital integrator for each of the regions. When the autofocus operation is restarted from the state of a monitoring mode in accordance with a variation of the focus evaluation value, the CPU detects a further hill of the focus evaluation value while forcibly moving a focus lens position always toward a near side, and when a maximal value of the once detected focus evaluation value is less than a certain standard value, additionally executes the autofocus operation.

11 Claims, 12 Drawing Sheets

IMAGING APPARATUS HAVING AUTOFOCUS FUNCTION

BACKGROUND OF THE INVENTION

1. Field of the Invention

The present invention relates to an imaging apparatus such as a video camera or a still camera, and more particularly, to an imaging apparatus having an autofocus function performing autofocus control based on a video signal obtained by imaging a subject.

2. Description of the Background Art

Conventionally, for an imaging apparatus having the autofocus function, such as a video camera or a still camera, a method has been developed in which a video signal itself obtained from the imaging apparatus is used for evaluating a focus control state, in view of the fact that a picture of a subject will have a higher contrast and a high frequency component of the video signal will be increased as the subject is more focused.

Such a method has a number of excellent characteristics such that no parallax essentially exists, and accurate focusing can be attained even when a depth of field is shallow or when a subject is located far from the imaging apparatus. Furthermore, such a method eliminates the need for additional provision of a sensor specific to autofocusing, and also extremely simplifies the mechanism of the apparatus.

An example of autofocus control using such a video signal includes a conventionally known control method referred to as a so-called hill-climbing servo method.

The hill-climbing servo method is disclosed in, for example, Japanese Patent Laying-Open No. 3-68280, which describes that, in summary, a high frequency component of digital data obtained by A/D converting an imaging video signal within a focus area set at the center of a screen is integrated by each field using an integrating circuit. The obtained digital data of one field is then held as a focus evaluation value, and relative positions of a focus lens and an imaging device are moved such that the focus evaluation value constantly assumes a peak value (i.e. the value is an in-focus position) by always comparing the focus evaluating value with a focus evaluating value in the previous field.

The autofocus control according to the conventional hill-climbing servo method was constituted such that the autofocus control was performed based on an imaging video signal within a relatively small focus area set at the center of the screen, and if no peak value, i.e. in-focus position, of the focus evaluation value was found, to expand the focus area and recommence the autofocus operation based on an imaging video signal within the expanded new focus area.

For example, FIG. 12 schematically shows a method of setting such a focus area on an imaging screen. In FIG. 12, a region 00 illustrated by a grid pattern indicates an entire imaging screen.

In the autofocus operation according to the conventional hill-climbing servo method, a relatively small region consisting of e.g. regions 0 and 5 in FIG. 12 was initially set as a focus area, and if no peak value was found in a series of focus evaluation values obtained from the imaging video signal within the area, a relatively large region further including regions 1, 2, 3 and 4 in addition to the regions 0 and 5 was set as a new focus area to recommence the autofocus control in accordance with a series of focus evaluation values based on the imaging video signal obtained from the entire focus area.

However, such above-described conventional autofocus control based on the series of focus evaluation values obtained from the entire focus area may cause a problem in that a subject cannot be accurately focused.

First of all, supposing that subjects are scattered at different distances within the imaging region, it is common, in taking a picture with a camera or the like, that a subject closer to the camera is basically assumed as a dominant subject and is to be focused. Here, in a case where subjects are scattered at different distances within, for example, the expanded focus area (regions 0 to 5) in FIG. 12, if the autofocus control started from a near side toward a distant side, it can be assumed that the dominant subject at the near side was focused at a peak position at the near side of a focus evaluation value that had found first.

However, if the autofocus operation started from the distant side toward the near side, some subject at the distance would be focused at a first-found peak position of the focus evaluation value at the distant side, making an intended subject at the near side out-of-focus.

Further, the dominant subject is generally located at the center of an imaging region, and thus the focus area is first set at the center of the imaging screen. However, in some cases, the subject may be shot intentionally off the center of the screen. When the dominant subject is thus present any of left, right, upper or lower side of the center region, a conventional method was used such that a user once determines the position of the dominant subject at the center of the imaging region and pushes a release switch of a camera halfway to focus the dominant subject by the autofocus operation, and thereafter moves the camera to bring the dominant subject off the center while keeping the release switch half-pushed before pushing the release switch all the way for shooting.

However, such a method is complicated, and a user having no knowledge thereof would just shoot the dominant subject off the center of the screen as it is, resulting in a picture in which the background is focused whereas the subject is out of focus.

Further, even though the dominant subject is simply positioned at the center, if the background has a high contrast, the high frequency component, i.e. focus evaluation value, of the video signal of the background would be increased, resulting in a picture in which only the background is focused (this is referred to as a background-focused state).

In particular, it would be difficult to focus a small dominant subject based on the focus evaluation value obtained from the entire focus area, and hence would be unavoidable that the distant background having a higher focus evaluation value would be focused.

SUMMARY OF THE INVENTION

Therefore, it is an object of the present invention to provide an imaging apparatus having an autofocus function which enables accurate focusing of an intended subject by dividing a focus area into a plurality of independent regions to perform various autofocus controlling processes based on variation of an focus evaluation value of each divided region, even in cases where subjects are scattered at different distances, where no subject exists at the center of an imaging region (i.e. an off-center state), where a background has a high contrast, and where a subject is small.

According to the present invention, an imaging apparatus having an autofocus function includes an imaging video signal generator, a driver, a first focus area setting controller, a first focus evaluation value generator, a first autofocus controller and a first autofocus restarting controller. The imaging video signal generator has a focus lens and an imaging device, and provides an imaging video signal. The driver moves a position of the focus lens relative to the imaging device. The first focus area setting controller sets a focus area divided into a plurality of regions on an imaging screen. The first focus evaluation value generator detects a high frequency component of the imaging video signal at each of the plurality of regions to generate a plurality of focus evaluation values respectively corresponding to the plurality of regions. The first autofocus controller executes an autofocus operation determining, from positions where the plurality of focus evaluation values respectively assume maximal values, a position where a maximal value can be attained at a closest side to be an in-focus position, and controlling the driver to move the focus lens position to the in-focus position The first autofocus restarting controller controls the driver to restart the autofocus operation and to determine an in-focus position while forcibly moving the position of the focus lens from the in-focus position toward a near side, whenever variation occurs in the plurality of focus evaluation values at the in-focus position. The autofocus operation is executed per certain period of the imaging video signal.

Therefore, according to the present invention, the focus area is divided into a plurality of regions to evaluate variation of the focus evaluation value of each region to determine the in-focus position, so that subjects in different states can accurately be focused. Particularly, the focus lens position is always moved toward the near side when the focus evaluation value is varied and the autofocus operation is restarted after the in-focus state is once obtained, so that an intended subject can more accurately be focused.

Thus, when a picture (particularly a portrait) is taken with a camera, a desired subject generally exists closer to the camera and things in the distance are basically considered as the background. In the conventional hill-climbing servo method, the focus lens position may be driven toward a distant side (to a infinite distance) so as to return to the peak position of the focus evaluation value at the time of restarting the autofocus operation, which results that a distant subject, i.e. the background, would be focused by driving the lens position to the infinite side, that is, the resulting picture would possibly be in a so-called background-focused state.

Therefore, the present invention is to drive the focus lens position always toward the near side when the autofocus operation is restarted, on the presupposition that there is a high possibility that an intended subject is present closer, to find a new peak of the focus evaluation value to more accurately focus the intended subject.

Preferably, the first autofocus restarting controller includes a first detector detecting a position where each of the plurality of focus evaluation values assumes a maximal value while moving the position of the focus lens from the in-focus position toward a near side, and a second detector detecting a position where the focus evaluation value assumes a further maximal value, when any maximal value of the plurality of focus evaluation values is lower than a certain standard value, by ignoring the maximal value and continuing movement of the position of the focus lens toward the near side.

Therefore, according to the present invention, when a detected maximal value of the focus evaluation value of any of the regions is lower than a certain standard value after restarting of the autofocus operation, the autofocus operation is proceeded toward a near side, and thus a further maximal position of the focus evaluation value can be detected, if any, to focus a subject closer to the camera.

Generally, if any subject is present at the near side, the maximal level of the focus evaluation value of a subject at the distant side would be lower. Therefore, even though the maximal value is once detected, if the detected maximal value is low, it is possible that another (intended) subject is present in an out-of-focus state at a even closer side.

Therefore, in the present invention, if the detected maximal value is low during movement of the focus lens position, the autofocus operation is proceeded over a hill of the value.

More preferably, the first autofocus restarting controller includes a first adjuster adjusting the number of executions of the autofocus operation to be greater when any maximal value of the plurality of focus evaluation values is lower than a certain standard value.

Therefore, according to the present invention, when a detected maximal value of the focus evaluation value of any of the regions is lower than the certain standard value after restarting of the autofocus operation, the number of executions of the autofocus operation can be increased to detect a further maximal value of the focus evaluation value, if any, to focus an even closer subject.

More preferably, the first autofocus restarting controller further includes a second adjuster adjusting the number of executions of the autofocus operation so as to continue movement of the position of the focus lens toward the near side when detected that the focus evaluation value is smaller than a previously detected maximal value but has an increasing tendency during movement of the position of the focus lens toward the near side.

Therefore, according to the present invention, if an increasing tendency of the focus evaluation value of any of the regions is detected even though the value is in a range not reaching the previously-detected maximal value of the focus evaluation value, movement of the focus lens position to the near side will continue, so that a further maximal value of the focus evaluation value can be detected, if any, to focus a subject at an even closer side.

Therefore, in the conventional hill-climbing servo method, the autofocus operation was terminated once the hill of the focus evaluation value was passed over after restarting of the autofocus operation, whereas the present invention is configured to find a subsequent hill if the hill of the focus evaluation value is small. However, it is necessary to increase the number of executions of the autofocus operation for that purpose, which causes insecure operation, so that the number of executions must be a required minimum.

Therefore, the present invention is to detect the increasing tendency of the focus evaluation value at first, and if the increasing tendency is detected, to continue the execution of the autofocus operation assuming that the subsequent hill of the focus evaluation value is present. This prevents insecure operation of the imaging apparatus.

More preferably, the first autofocus restarting controller further includes a third adjuster adjusting the number of executions of the autofocus operation to decrease the number of executions of the autofocus operation for continuing the movement of the position of the focus lens toward the near side when a depth of field of the imaging video signal generator is set deep, and to increase the number of executions of the autofocus operation for continuing movement of the position of the focus lens toward the near side when a depth of field is set shallow.

Therefore, according to the present invention, the number of executions of the autofocus operation for continuing movement of the focus lens position toward the near side is thus adjusted in accordance with the depth of field set for the imaging video signal generator, so that unnecessary autofocus operations can be avoided.

Thus, when the zoom is set to a telephoto side, the depth of field will be shallower, the width of variation of the focus evaluation value (the width of a hill) will be narrower, and the distance between the hills of the focus evaluation value will be larger. Therefore, the number of executions of the autofocus operation must be increased in order to capture the subsequent hill. On the other hand, when the zoom is set to the wide-angle side, the depth of field will be deeper, the width of variation of the focus evaluation value (the width of a hill) will be wider, and the distance between the hills of the focus evaluation value will be narrower. Thus, the number of executions of the autofocus operation for capturing the subsequent hill can be decreased.

Here, if the number of executions of the autofocus operation is adapted to, for example, the standard of the wide-angle side, the subsequent hill of the focus evaluation value cannot be captured when the zoom is set to the telephoto side. Whereas, if the number of executions of the autofocus operation is adapted to, for example, the standard of the telephoto side, an unnecessary autofocus operation would be executed when set to the wide-angle side.

Therefore, the present invention is to adjust the number of executions of the autofocus operation in accordance with the set depth of field.

More preferably, the first autofocus restarting controller further includes a fourth adjuster adjusting the number of executions of the autofocus operation to decrease the number of executions of the autofocus operation for continuing movement of the position of the focus lens toward the near side when the position of the focus lens is at a near side at the time of restarting the autofocus operation, and to increase the number of executions of the autofocus operation for continuing movement of the position of the focus lens toward the near side when the position of the focus lens is at a distant side at the time of restarting the autofocus operation.

Therefore, according to the present invention, the number of executions of the autofocus operation for continuing the movement of the focus lens position toward the near side is adjusted in accordance with the location of the in-focus position where the autofocus operation is restarted, whether it is at the near side or at the distant side, so that an unnecessary autofocus operation can be avoided.

That is, when the autofocus operation is restarted at the near side, not so great number of executions of the autofocus operation would be needed to find a hill of the focus evaluation value presumed to be present even closer. When, on the other hand, the autofocus operation is restarted at the distant side, a certain number of executions of the autofocus operation would be required to find a hill of the focus evaluation value presumed to be present at the near side.

Therefore, the present invention is to adjust the number of executions of the autofocus operation in accordance with the position where the autofocus operation is restarted.

More preferably, the imaging apparatus further includes a luminance data generator detecting a luminance component at each of the plurality of regions to generate a plurality of luminance data respectively corresponding to the plurality of regions, and the first autofocus restarting controller includes a restart stop controller stopping the restarting of the autofocus operation when variation of respective luminance data of the plurality of regions are relatively large.

Therefore, according to the present invention, when variations of respective luminance data of a plurality of regions are relatively large, it is determined that the camera is in panning, during which the autofocus operation would not be restarted, preventing unnecessary autofocus operations during panning.

More preferably, the first autofocus restarting controller includes an autofocus terminating controller inverting a movement direction of the position of the focus lens toward a distant side if no in-focus position can be determined even though the position of the focus lens is moved toward a near side, and determining a position of a maximal value of a focus evaluation value detected first after the inversion as an in-focus position to terminate the autofocus operation.

Therefore, according to the present invention, when the focus position cannot be detected by moving the focus lens position to the near side as described above, the moving direction of the focus lens position is inverted to the distant side and the first detected hill of the focus evaluation value is determined to be the focus position, so that more accurate focusing of the intended subject is enabled.

Thus, if the subject which has focused at the near side suddenly disappears from view, leaving nothing at the near side, then the moving direction is inverted after the focus lens position is once moved toward the near side, and the first detected hill of the focus evaluation value is determined as the focus position in accordance with the principle that the focus position at the near side is given a priority, to terminate the autofocus operation.

More preferably, the imaging apparatus further includes a luminance data generator detecting a luminance component at each of the plurality of regions to generate a plurality of luminance data respectively corresponding to the plurality of regions, and a focus evaluation value controller excluding a focus evaluation value corresponding to a region where high luminance data is present, if any, among the plurality of regions, from a plurality of focus evaluation values to be targets of the autofocus operation by the autofocus controller.

Therefore, according to the present invention, when high luminance data exists in any of the plurality of regions, the focus evaluation value of the region is excluded from the targets of the autofocus operation, so that a more accurate focusing can be realized.

Thus, in the focus evaluation value of a region where a high luminance part is included, a false hill of the focus evaluation value may be generated other than an intended focus position, and the focus lens position may be driven in accordance with the false hill erroneously determined as a focus position.

Therefore, in the present invention, the focus evaluation value of the region including the high luminance part is excluded from the autofocus operation to prevent driving of the focus lens position by such a false hill of the focus evaluation value.

More preferably, the imaging video signal generator selectively supplies an imaging video signal of a still picture or an imaging video signal of a moving picture, and the imaging apparatus further includes a second focus area setting controller setting a plurality of focus areas or a single focus area, undivided into a plurality of regions; a second focus evaluation value generator detecting a high frequency component of the imaging video signal in the undivided focus area, to generate a focus evaluation value; a second autofocus controller executing an autofocus operation controlling the driver to determine a position where a focus evaluation value generated by the second focus evaluation value generator assumes a maximal value as an in-focus position and to move the position of the focus lens to the in-focus position; a second autofocus restarting controller controlling the driver to restart the autofocus operation to determine an in-focus position whenever variation occurs in the focus evaluation value at the in-focus position; and a switch controller operating the second focus area setting controller, the second focus evaluation value generator, the second autofocus controller and the second autofocus restarting controller in place of the first focus area setting controller, the first focus evaluation value generator, the first autofocus controller and the first autofocus restarting controller, when an imaging video signal of the moving picture is supplied from the imaging video signal generator.

Therefore, according to the present invention, when an imaging video signal of a moving image is supplied from an imaging video signal generator, the autofocus operation is performed by the conventional hill-climbing servo method based on the focus evaluation value obtained from the undivided focus area, so that no blur would be noticeable in moving pictures.

In recording of the imaging video signal of the moving image, the focus lens position may be driven over the hill of the focus evaluation value in the autofocus restarting operation based on the focus evaluation value of the undivided focus area, in which case blur may be noticeable on the screen. Because stability of the screen is considered to be important especially for moving image recording, the conventional autofocus operation is utilized in such a case.

More preferably, the imaging apparatus further includes a second focus area setting controller setting a plurality of focus areas or a single focus area, undivided into a plurality of regions; a second focus evaluation value generator detecting a high frequency component of the imaging video signal in the focus area undivided, to generate a focus evaluation value; a second autofocus controller executing an autofocus operation controlling the driver to determine a position where a focus evaluation value generated by the second focus evaluation value generator assumes a maximal value as an in-focus position to move the position of the focus lens to the in-focus position; a second autofocus restarting controller controlling the driver to restart the autofocus operation and to determine an in-focus position whenever variation occurs in the focus evaluation value at the in-focus position; and a switch controller operating the second focus area setting controller, the second focus evaluation value generator, the second autofocus controller and the second autofocus restarting controller, in place of the first focus area setting controller, the first focus evaluation value generator, the first autofocus controller and the first autofocus restarting controller, when no in-focus position can be detected after restarting of the autofocus operation by the first autofocus restarting controller.

Therefore, according to the present invention, when the in-focus position cannot be detected after restarting of the autofocus operation using such a divided focus area, the autofocus operation is performed by the conventional hill-climbing servo method based on the focus evaluation value obtained from an undivided focus area, enabling detection of the in-focus position.

Thus, when the focus area is divided into a plurality of regions to calculate the focus evaluation values, the contrast of each region may be low and hence a sufficient magnitude of the focus evaluation value may not be obtained, which would make it difficult to find a focus position based on the focus evaluation value. Therefore, in such case, the focus area would not be divided, and the focus position would be found based on the focus evaluation value from the entire focus area.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
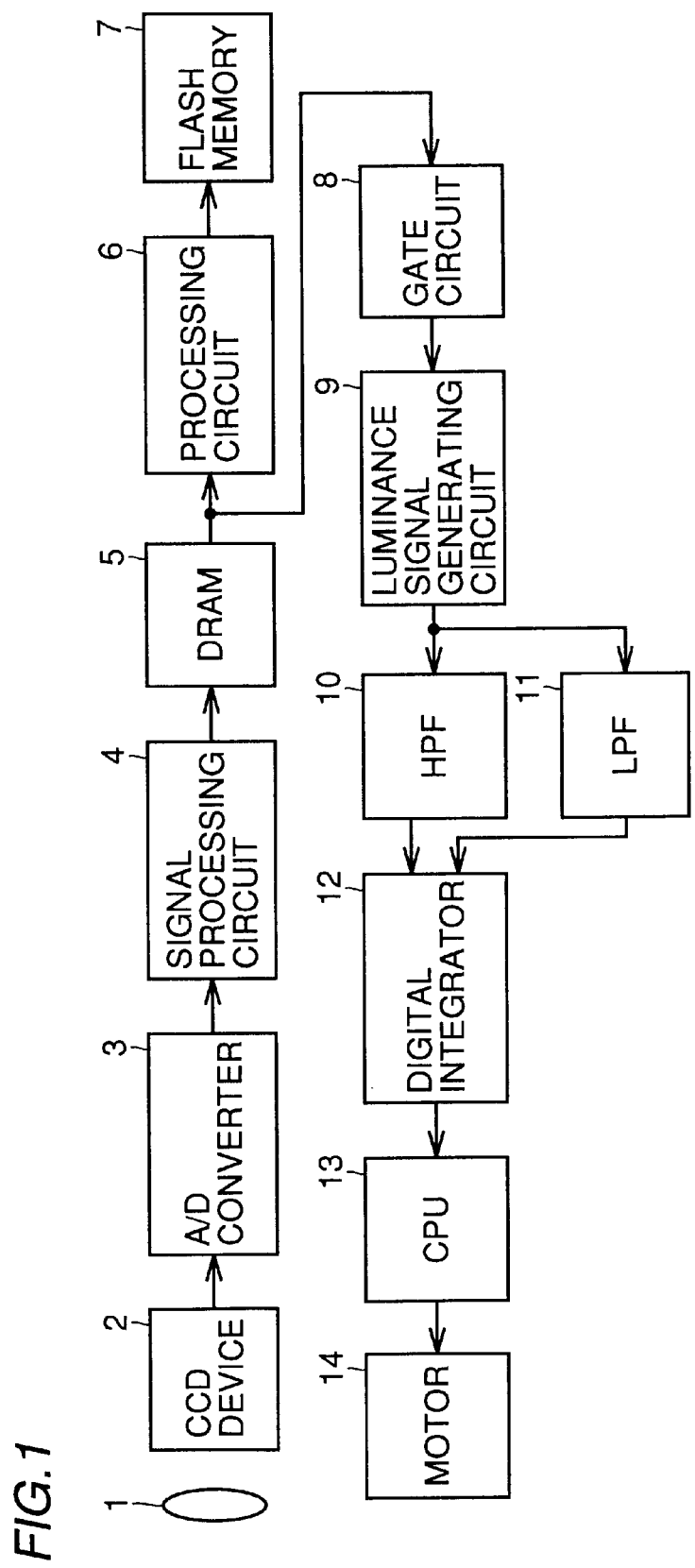
FIG. 1 is a schematic block diagram showing a configuration of a still camera according to an embodiment of the present invention.

Embodiments of the present invention will be described below in detail with reference to the drawings. It is noted that the same or corresponding portions in the drawings are denoted by the same reference characters, and the descriptions thereof will not be repeated.

The present invention can be applied to an imaging apparatus adaptable to at least either a moving picture or a still picture, such as a video camera dedicated for recording moving pictures and a still camera dedicated for recording static pictures, and further a still camera also capable of recording moving pictures which has been practically utilized in recent years. The embodiments below particularly exemplify the still camera capable of moving picture recording.

FIG. 1 is a schematic block diagram of a still camera capable of recording moving pictures according to an embodiment of the present invention.

Referring to FIG. 1, incident light entered via a focus lens 1 is photoelectrically converted by a CCD device (Charge-Coupled Device) 2 to generate an imaging video signal. The generated imaging video signal is converted into a digital signal by an A/D converter 3 before being applied to a signal processing circuit 4.

Signal processing circuit 4 provides the digital imaging video signal with well-known white balance correction and γ correction, and sequentially forms image data for each field (each screen) of the imaging video signal to apply the data to a DRAM (Dynamic Random Access Memory) 5.

DRAM 5 sequentially stores the input image data of each field one after another, and applies the stored image data of each field to a processing circuit 6 and a gate circuit 8.

Processing circuit 6 provides the image data of one field read from DRAM 5 with a well-known signal process such as a color separation process, and thereafter compresses the image data in a software manner to store the data in a flash memory 7 at a subsequent stage. The compressed image data stored in flash memory 7 is read and expanded by a signal processing circuit (not shown), and is displayed on a liquid crystal monitor (not shown).

The image data per field unit stored in DRAM 5 is also applied to gate circuit 8. Gate circuit 8, a luminance signal generating circuit 9 at a subsequent stage, an HPF (High-Pass Filter) 10, an LPF (Low-Pass Filter) 11, a digital integrator 12, a CPU (Central Processing Unit) 13 and a focus motor 14 are circuit configurations provided for an autofocus operation.

There are different types of still cameras including a type performing the autofocus operation always using these circuit configurations 8 to 14, independent of on/off of a release switch, and a type performing the autofocus operation using these circuit configurations 8 to 14 only when the release switch is turned on at the time of taking a picture.

Both types make no difference in terms of using circuit configurations 8 to 14 to perform the autofocus operation, so that the present invention can be applied to either type of the still camera. The following description of the embodiments describes a still camera of the type performing the autofocus operation after the release switch is turned on.

When a user turns on (or half-pushes) the release switch, the image data stored by one field unit in sequence into DRAM 5 from signal processing circuit 4 are also sequentially applied to gate circuit 8.

Gate circuit 8 extracts the image data within a set focus area to apply the data to luminance signal generating circuit 9. The manner of setting of the focus area in gate circuit 8 is now described.

As will be described later in detail, the still camera according to the present invention enables setting of the focus area by a conventional autofocus operation described earlier and setting of the focus area by an autofocus operation specific to the present invention (hereinafter referred to as multi-autofocus (AF) operation), by a software processing.

When the conventional autofocus operation is designated, as described earlier with reference to FIG. 12, a relatively small region consisting of regions 0 and 5 is first set as an undivided single focus area, and thereafter a relatively large region consisting of regions 0 to 5 is set similarly as an undivided single focus area. In either case, a series of focus evaluation values can be obtained from the entire focus area.

Whereas, the multi-autofocus operation according to the present invention sets a focus area divided by independent regions 0, 1, 2, 3 and 4, and generates a focus evaluation value independently for each region.

Gate circuit 8 receives an instruction from CPU 13 to switch such settings of the focus area.

The image data within the focus area on the imaging screen set by gate circuit 8 is extracted and applied to luminance signal generating circuit 9. Luminance signal generating circuit 9 generates a luminance signal from the provided image data, and applies the data to HPF 10 and LPF 11.

HPF 10 extracts a high frequency component from the luminance signal and applies the extracted component to digital integrator 12, which integrates the high frequency component by one screen (one field period) to apply it to CPU 13 as a focus evaluation value.

LPF 11 extracts a low frequency component from the luminance signal and applies the extracted component to digital integrator 12, which integrates the low frequency component by one screen (one field period) to apply it to CPU 13 as luminance data.

CPU 13 drives focus motor 14 in accordance with an autofocusing program which will be described later, so as to move the positional relation of focus lens 1 to CCD device 2.

Figure 2:
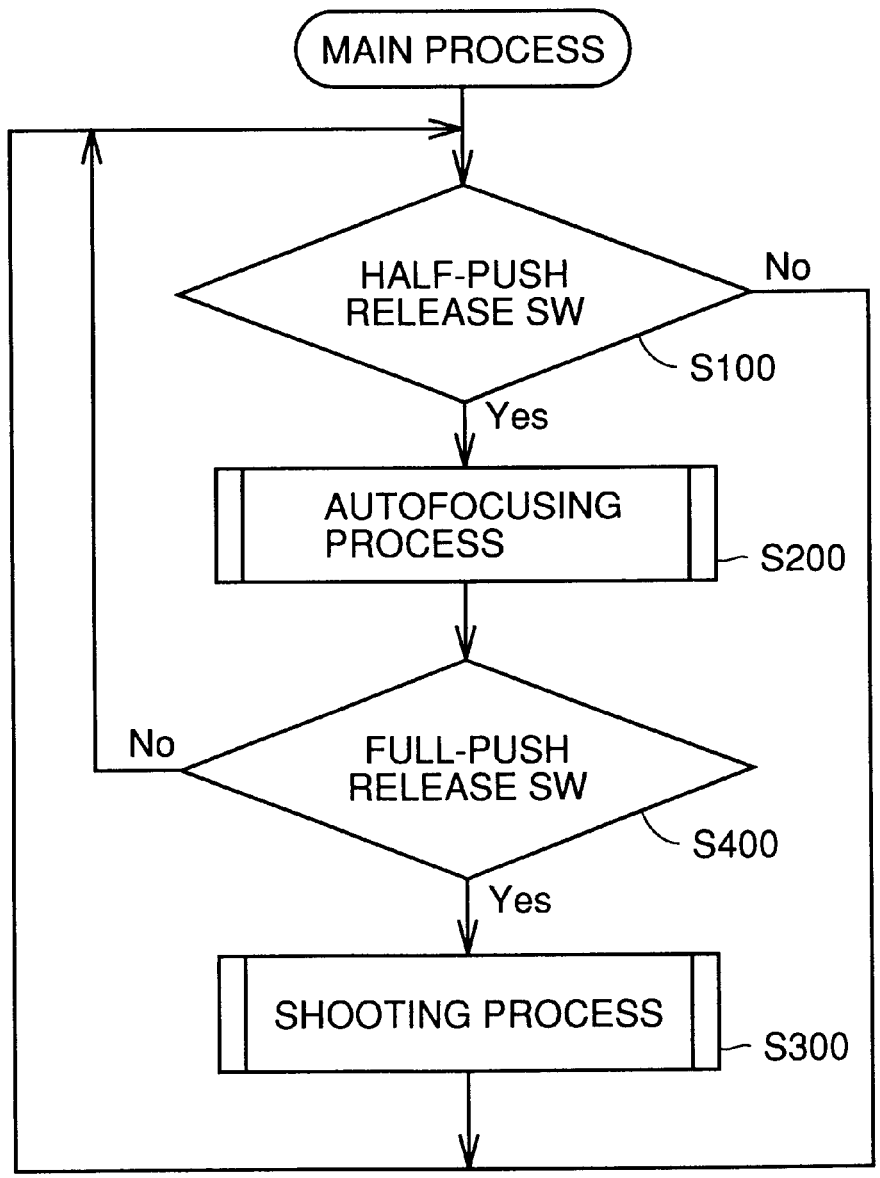
FIG. 2 is a flowchart illustrating a basic operation of the still camera shown in FIG. 1.

FIG. 2 is a flowchart illustrating a basic operation of the still camera shown in FIG. 1. Referring to FIG. 2, CPU 13 waits until a release switch (not shown) is half-pushed by a user, and if half-pushing of the release switch is determined in step S100, executes autofocus control in step S200 using circuit configurations 8 to 14 in FIG. 1, and if the release switch is not pushed all the way in step S400, then the process goes back and CPU 13 executes step S100. Details of the autofocus control is described below.

The autofocus control is executed in step S200, and if step S400 determines that the release switch is pushed all the way, then a well-known process such as a process of taking in the shooting image data into flash memory 7 will be performed.

The autofocus operation of the present invention shown in step S200 will be described below in detail.

A main process of the autofocus operation (hereinafter referred to as AF main process) executed by CPU 13 in a software manner is first described with reference to the flowcharts shown in FIGS. 3 and 4. It is noted that each process described below is executed per field of the image data stored in DRAM 5 shown in FIG. 1.

Figure 12:
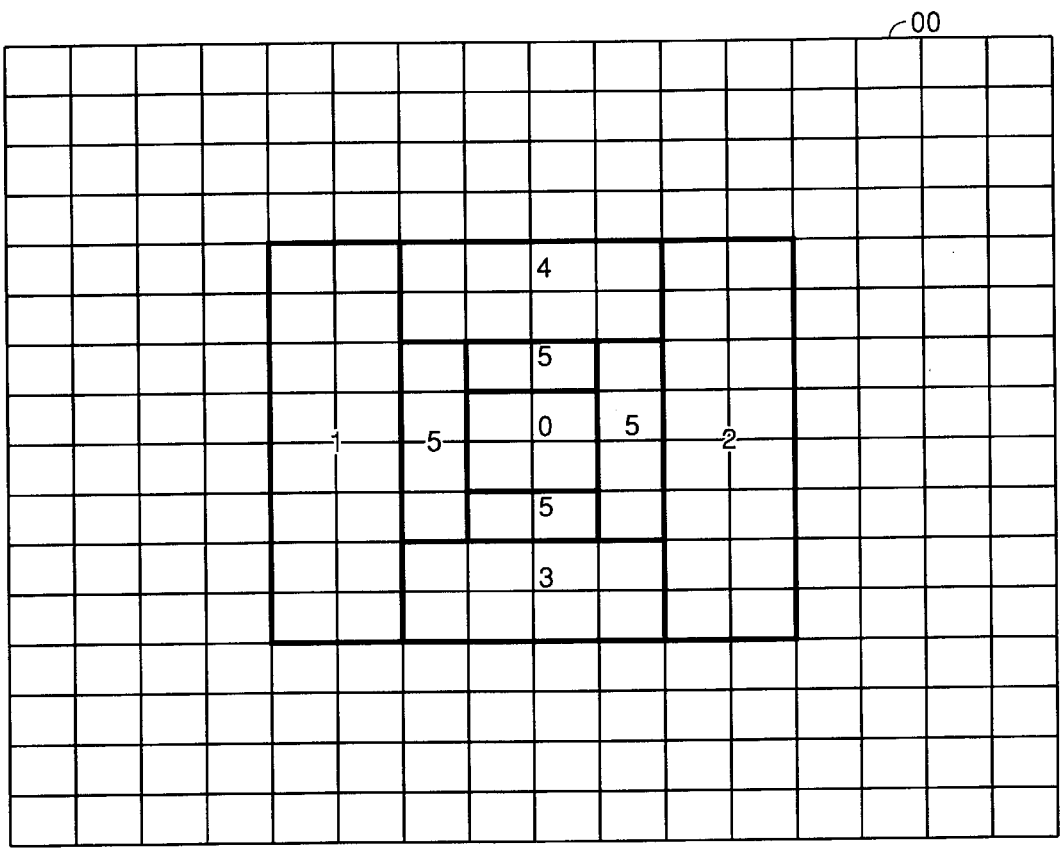
FIG. 12 is a schematic diagram illustrating a method of setting a focus area by a conventional still camera and a still camera of the present invention.

First, in step S0, a region number i indicating regions 0, 1, 2, 3, 4 or 5 constituting the focus area in FIG. 12 is set as i=0.

Subsequently, in step S1, with respect to the region i=0, the obtained focus evaluation value (hereinafter referred to as AF evaluation value) is held as af_data [i], and the luminance data is held as ae_data [i]. Then, the luminance data ae_stk [i] obtained by the process in the previous field is subtracted from the luminance data ae_data [i] obtained this time, to find a difference, delta [i]. Next, ae_data [i] obtained this time is stored as ae_stk [i] for processing in the next field.

Thereafter, in step S2, presence or absence of a high luminance part in region i=0 is determined. This is determined by whether or not the luminance data ae_data [i] obtained in step S1 is larger than a constant THR_A. When it is larger, the high luminance part is assumed to be present and a flag hi_light [i] with respect to region i=0 will be 1 (step S3), whereas, when it is smaller, the high luminance part is assumed to be absent and the flag hi_light [i] will be 0 (step S4).

Subsequently, in step S5, 1 is added to i making i=1, and i=1>4 is not satisfied in step S6 so that the process goes back to step S1, resulting that the AF evaluation value and the luminance data obtained with respect to region i=1 are held.

In the following processes, steps S1 to S6 described with respect to region i=0 are repeated for regions i=1, 2, 3 and 4, and when 1 is added to i=4 in step S5 making i=5>4 is attained in step S6, the process goes on to step S7.

Thus, in steps S2 to S4 described above, among regions 0 to 4, a region i where the high luminance part is present is indicated by flag hi_light [i] for its existence.

Step S7 determines whether delta [i] of a variation of the luminance data for each region obtained in step S1 described above is large, and whether or not the sign indicating a varying direction of the variation delta [i] of each region is consistent for all the regions.

This process is performed to differentiate, for example, variation or flicker of illumination and camera panning by a user. That is, in the case of the variation or flicker of illumination, the sign of luminance variation would be consistent in all the regions 0 to 4, whereas the direction of luminance variation would be random for each region and it is unlikely to attain the same sign in every region when the user pans the camera.

Therefore, when the luminance variation delta [i] of regions 0 to 4 is large and the signs thereof are consistent for all the regions, it is determined that no panning is being performed and a flag b_pan assumes 0 (step S9), and when otherwise, it is determined that panning is being performed and flag b_pan assumes 1 (step S8).

Subsequently, step S10 determines whether or not the hill-climbing servo control is in a monitoring mode (a mode for monitoring variations of the AF evaluation value at an in-focus position) is determined. If it is in the monitoring mode, step S11 determines whether or not it was in the monitoring mode in the previous field.

The fact that the servo control was not in the monitoring mode in the previous field means that the autofocus operation was terminated in the previous field and the monitoring mode is started in the present field. Therefore, if this is the case, the AF evaluation value obtained in this field is held as a standard evaluation value for monitoring in step S12, and the process goes on to step S13. On the other hand, if it is determined that the monitoring mode was already started in the previous field, the process skips step S12 and proceeds directly to step S13.

If step S13 determines that the AF evaluation value obtained in this field is not greatly varied from the standard evaluation value for monitoring held in step S12 at the time of starting of the monitoring mode, the AF main process in the present field is terminated, and the AF main process will be performed again from the beginning in the next field.

On the other hand, if step S13 determines that the AF evaluation value obtained in the present field has greatly been varied from the standard evaluation value for monitoring, then step S14 determines whether or not the still camera is recording moving pictures.

If step S14 determines that the camera is recording moving pictures, a flag multi_af_mode assumes 0 in step S16 and the conventional autofocus mode (conventional AF) described later is set. The monitoring mode is then canceled in step S17, and the autofocus operation will be performed by the conventional autofocus operation mode in the next field.

On the other hand, if step S14 determines that the camera is not recording moving pictures, the flag multi_af_mode assumes 1 in step S15, and the multi-AF operation mode according to the present invention is designated. Further, in step S15, a flag dir_mode designating a driving direction is set to be 0 designating movement toward a near side, and start_mpos indicating a starting position of focus motor 14 is set to be a focus motor position mpos_stk in the previous field, which corresponds to the current focus lens position. Also in step S15, variables max_data [ ] and peak_det used in the multi-AF mode operation described later is cleared.

Subsequently, the monitoring mode is canceled in step S17, and the autofocus operation by the multi-AF operation mode of the present invention will be executed in the next field.

On the other hand, if step S10 determines that the camera is not in the monitoring mode, which means that the autofocus operation is already in execution, step S18 then determines whether or not a flag multi_af_mode is set to be 1 in the processes of steps S15 and S16 for the preceding field described earlier, that is, whether the multi-AF operation or the conventional AF operation is designated.

If multi_af_mode is 1 in step S18, the multi-AF mode operation described later is executed in step S19, whereas if multi_af_mode is 0 in step S18, the conventional AF mode operation described later will be executed in step S20.

Figure 3:
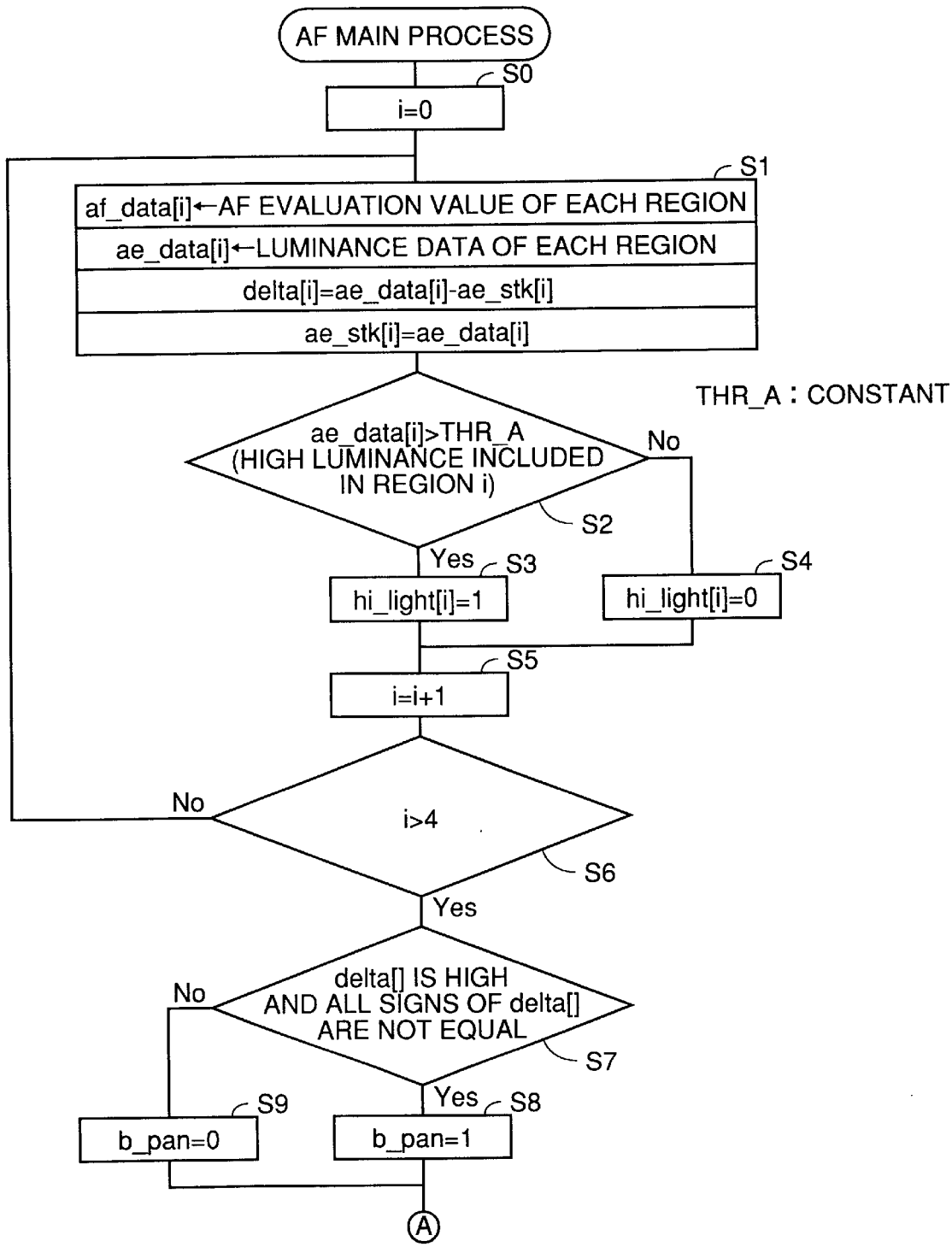
FIG. 3 is a flowchart showing the first half of an AF main process according to an embodiment of the present invention.
Figure 4:
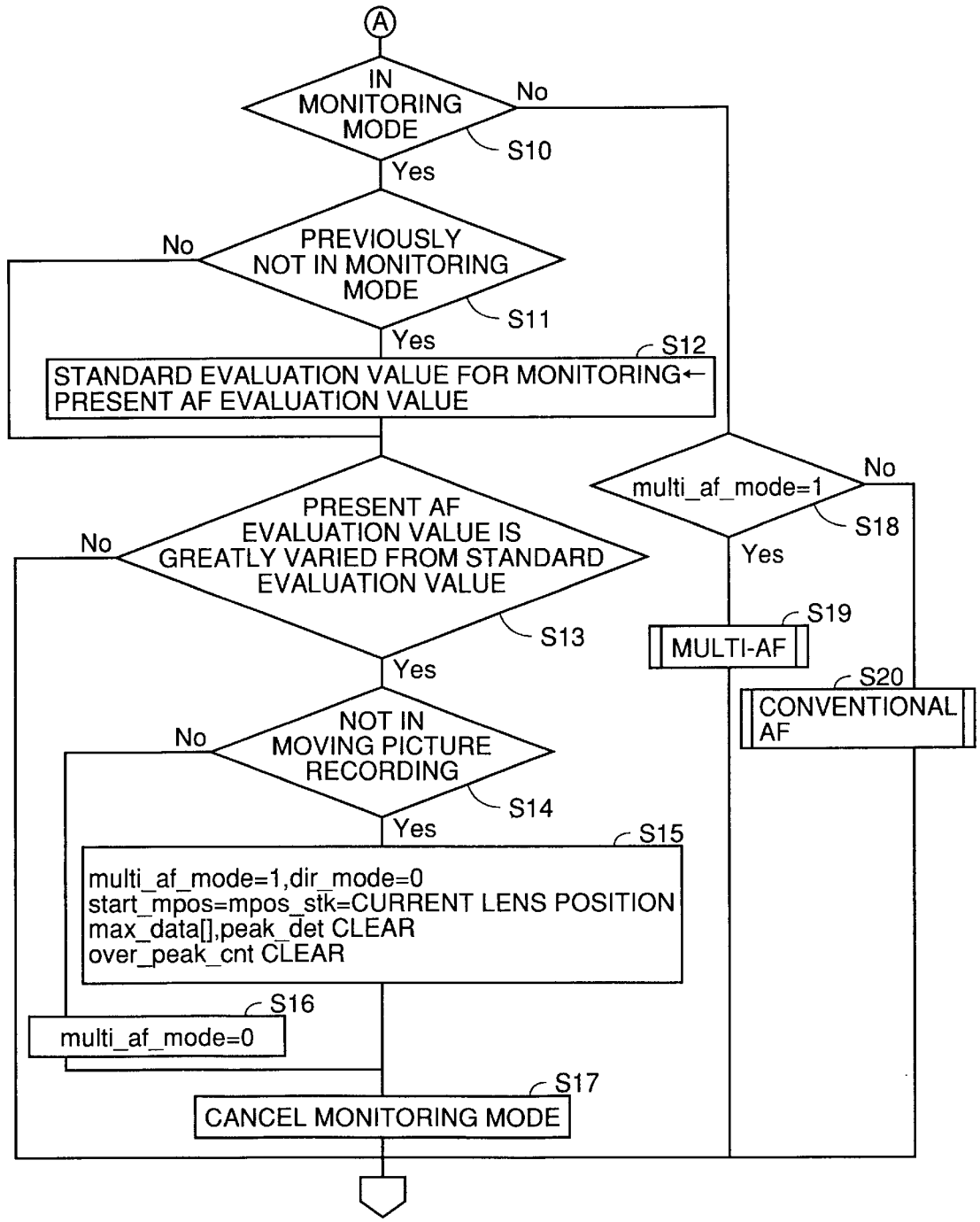
FIG. 4 is a flowchart showing the latter half of the AF main process according to an embodiment of the present invention.

Thus, in the AF main process shown in FIGS. 3 and 4, the AF evaluation value is greatly varied in the monitoring state (step S13), the monitoring mode is canceled (step S17), and when the autofocus operation is restarted, a driving directional flag dir_mode is always set to be 0 indicating the near side in step S15 to drive the focus lens position always toward the near side in the subsequent autofocus operations.

Figure 11A:
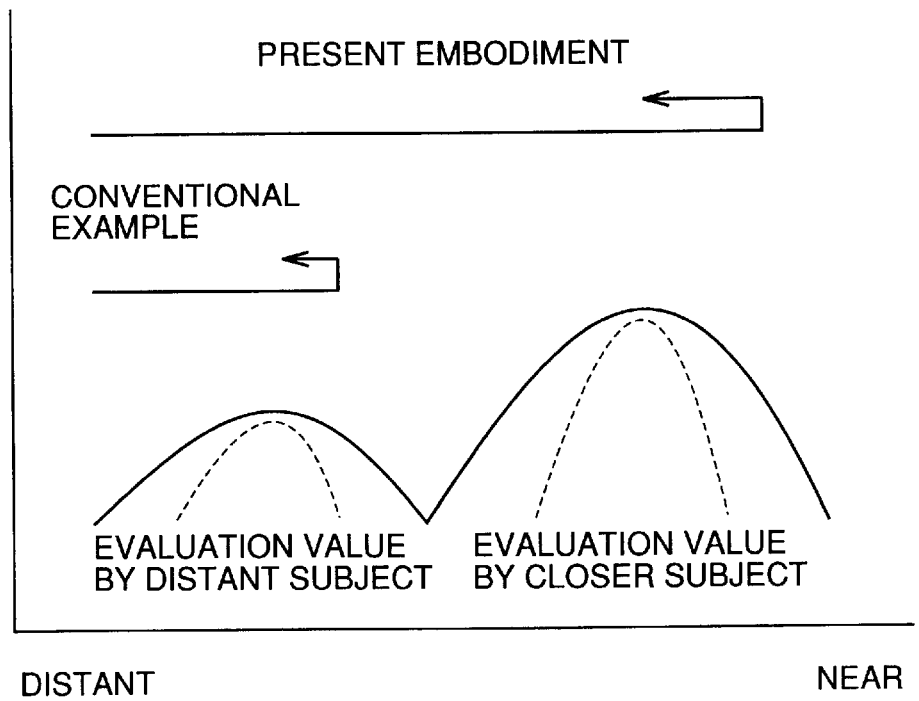
FIGS. 11A and 11B schematically show an operation principle of the present invention.
Figure 11B:
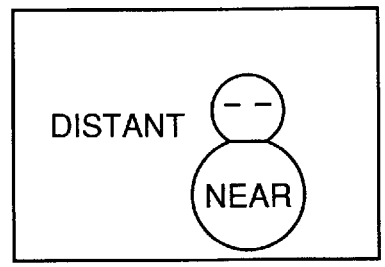

Here, at the time of shooting with the still camera, a desired subject is generally closer to the camera, and things in the distance basically forms the background, as shown in FIG. 11B. Referring to FIG. 11A, in the conventional hill-climbing servo method, the focus lens position may be driven to a distance (an infinite side) to go back to the peak position of the AF evaluation value when the autofocus operation is restarted from the monitoring mode. However, when driven to the infinite side, distant subjects, i.e. the background, may possibly be focused.

Therefore, the AF main process of the present invention shown in FIGS. 3 and 4 sets the driving directional flag dir_mode to be 0 when the autofocus operation is restarted from the monitoring mode to drive the focus lens always toward the near side, and to find a new peak of the AF evaluation value at the near side for accurately focusing an intended subject on the presumption that there is a high possibility that the desired subject exists at the closer side.

Further, if it is determined that the camera is recording moving pictures (step S14), the flag multi_af_mode is set to be 0, and the autofocus operation mode using the conventional undivided focus area is executed (step S20) for the autofocus operations in the following fields after cancellation of the monitoring mode (step S17). Thus, there will be no noticeable blur in the moving pictures.

When recording moving pictures, a multi-AF operation based on the focus evaluation value of the divided focus area according to the present invention may drive the focus lens position beyond the hill of the AF evaluation value as described later, possibly causing noticeable blur on the screen, so that the conventional AF operation mode would be executed in a case of moving picture recording, since image stability is considered to be important especially in such a case.

Figure 5:
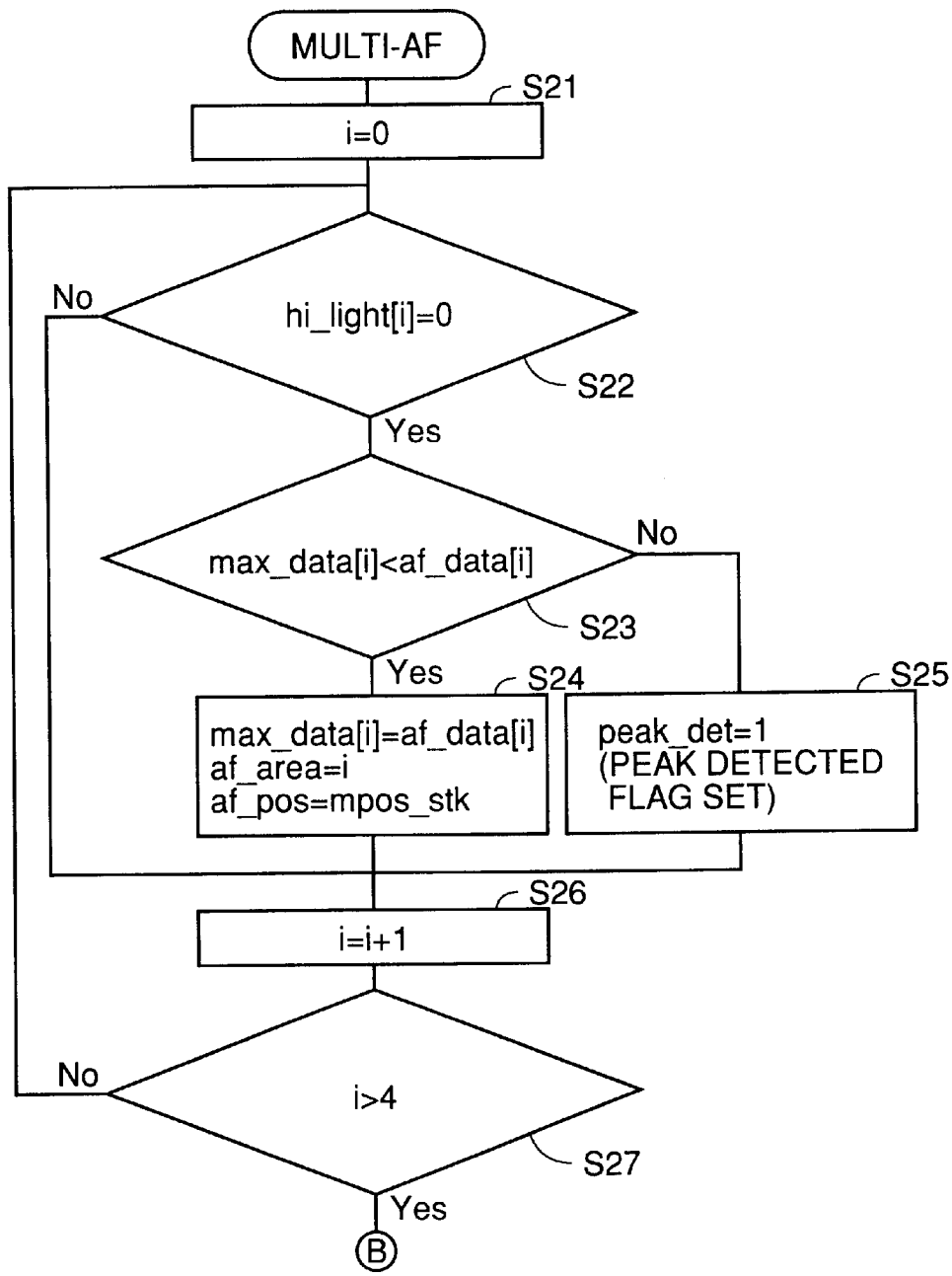
FIG. 5 is a flowchart showing the first half of a multi-AF process according to an embodiment of the present invention.

Subsequently, the autofocus operation of the multi-AF mode according to the present invention executed in step S19 in FIG. 4 will be described with reference to the flowcharts in FIGS. 5 and 6.

First, in step S21, region number i is set as i=0.

Next, in step S22, presence or absence of the high luminance part in region i=0 is determined with reference to flag hi_light [i] in region i=0. If the flag hi_light [i] is 0, the high luminance part is assumed to be absent and the process goes on to step S23. If the flag hi_light [i] is 1, on the other hand, the high luminance part is assumed to be present, and the process goes on to step S26.

If, in step S23, the AF evaluation value af_data [i] in the current field is determined to be larger than a maximal value data max_data [i] detected in the preceding field, the maximal value data max data [i] is updated with the AF evaluation value af_data [i] in the current field in step S24, and a region where af_data [i] is updated is set as af_area=i. Further, in view of delay in data reading, a process is performed such that the motor position mpos_stk in the previous field is assumed to be a focus position af_pos in the present field.

On the other hand, if step S23 determines that the AF evaluation value af_data [i] in the current field is no greater than the maximal value data max_data [i], the peak of the AF evaluation value is assumed to be detected, and a peak detected flag peak_det is set to be 1 in step S25.

Step S24 or S25 proceeds to step S26, 1 is added to i making i=1, and i=1>4 is not satisfied in step S27 so that the process goes back to step S22, and subsequently, steps S22 to S27 described for region i=0 will be repeated for regions i=1, 2, 3 and 4. When 1 is added to i=4 in step S26 such that i=5>4 is attained in step S27, the process goes on to step S28.

In the processes of steps S22 to S27 described above, the AF evaluation value in the region including the high luminance part is excluded from the peak detection of the AF evaluation value, not going through the processes of steps S24 to S26.

Thus, a false hill is produced at a position other than the intended focus position in the AF evaluation value in the region where the high luminance part is present, erroneously determining this false hill as a focus position and moving the focus lens. Therefore, the present invention excludes the AF evaluation value of the region including the high luminance part from the peak detection to prevent occurrence of malfunctions.

Thereafter, step S28 determines whether or not the focus lens position reaches a near-end side. Then, if it is determined that the lens position has not yet reached the near-end side, a "continuation process" performing the autofocus operation going over the hill of the AF evaluation value is executed as described later in step S29. Details of the continuation process will be described later with reference to the flowcharts of FIGS. 7 and 8.

As will be described, a flag keizoku is set or cleared during the continuation process. If keizoku is 0 in step S30, the continuation process is instructed to be proceeded, and a constant AFSTEP is assigned, in step S31, to a variable afpls corresponding to the number of pulses instructing a distance of movement of focus motor 14.

Subsequently, a driving direction of the focus lens is determined in step S32. If dir_mode is 1, the focus lens is driven to the infinite distant side, so that the sign of the number of driving pulses, i.e. the driving direction, of the focus motor is inverted in step S33 before proceeding to step S34. If dir_mode is 0, meaning that the focus lens is driven toward the near side, the process directly goes on to step S34.

On the other hand, if step S28 determines that the focus lens position reaches the near-end side, the driving direction of the focus lens is determined in step S37. The driving direction is set to the near side when dir_mode is 0, and thus dir_mode is set to be 1 in step S38 for inverting the driving direction to the infinite side. Thereafter, in step S39, the number of driving pulses of the focus motor is set to be 0 so as to stop driving of the focus motor, and the process goes on to step S34.

Further, step S37 determines that the driving direction is set to the infinite side via the near-end side when dir_mode is 1, and step S40 determines whether or not the peak has already been detected in the previous step S25.

If peak_det is 1 _in step S40, meaning the peak has already been found, focus lens 1 is driven, in step S42, to the position of af_pos set in step S24. Thereafter, the monitoring mode is set in step S43, and the focus motor driving pulse is set to be 0 in step S39 to stop driving of the focus motor, and then the process goes on to step S34.

On the other hand, if peak_det is 0 in step S40, meaning the peak has not yet been found, multi_af_mode is set to be 0 in step S41 and the autofocus mode is set as the conventional AF mode. Then, in step S39, the focus motor driving pulse is set to be 0 so as to stop driving of the focus motor, and the process goes on to step S34.

Here, the reason why the multi-AF mode is changed to the AF mode using the conventional undivided focus area in step S41 when the peak has not been found while reaching the near end in the multi-AF mode, will be described.

When the focus area is divided into a plurality of regions to calculate the AF evaluation value, the contrast of each region may be too low to obtain the AF evaluation value of a sufficient magnitude, in which case it will be difficult to find the focus position based on the AF evaluation value. Therefore, in such a case, dividing of the focus area is stopped to freshly find a focus position based on the AF evaluation value from the entire focus area.

Figure 6:
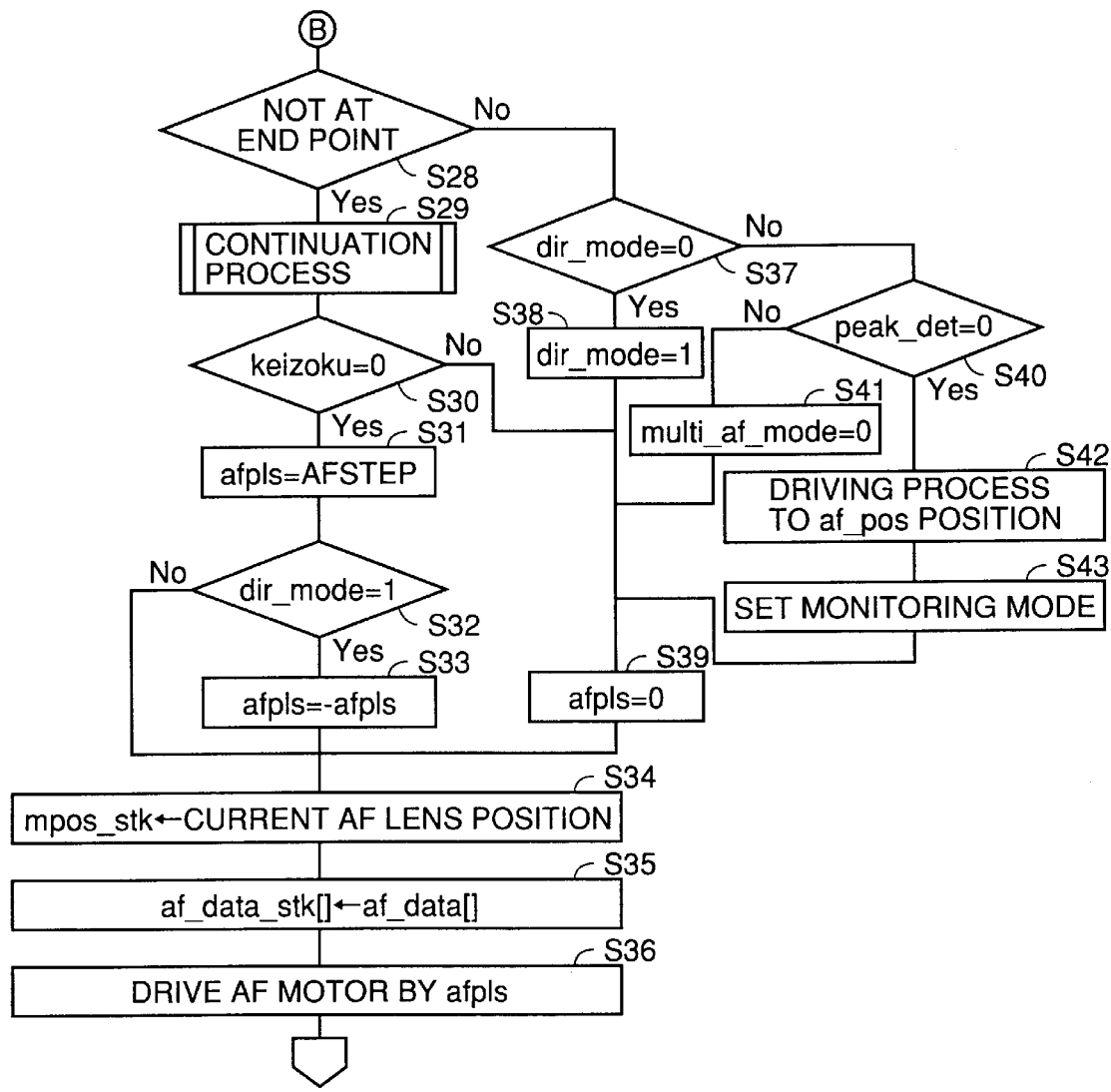
FIG. 6 is a flowchart showing the latter half of the multi-AF process according to an embodiment of the present invention.

Back to the processes in FIG. 6, in step S34, the current focus lens position is assigned to the motor position mpos_stk in the previous field corresponding to the maximal position. Subsequently, in step S35, the present AF evaluation value af_data [ ] is assigned to the previous AF evaluation value af_data_stk [ ]. This is to examine the increasing tendency of the AF evaluation value.

Subsequently, in step S36, the focus motor is driven in accordance with the number and the direction of the pulse indicated by afpls that are set in steps S31 and S33, or step S39.

Figure 7:
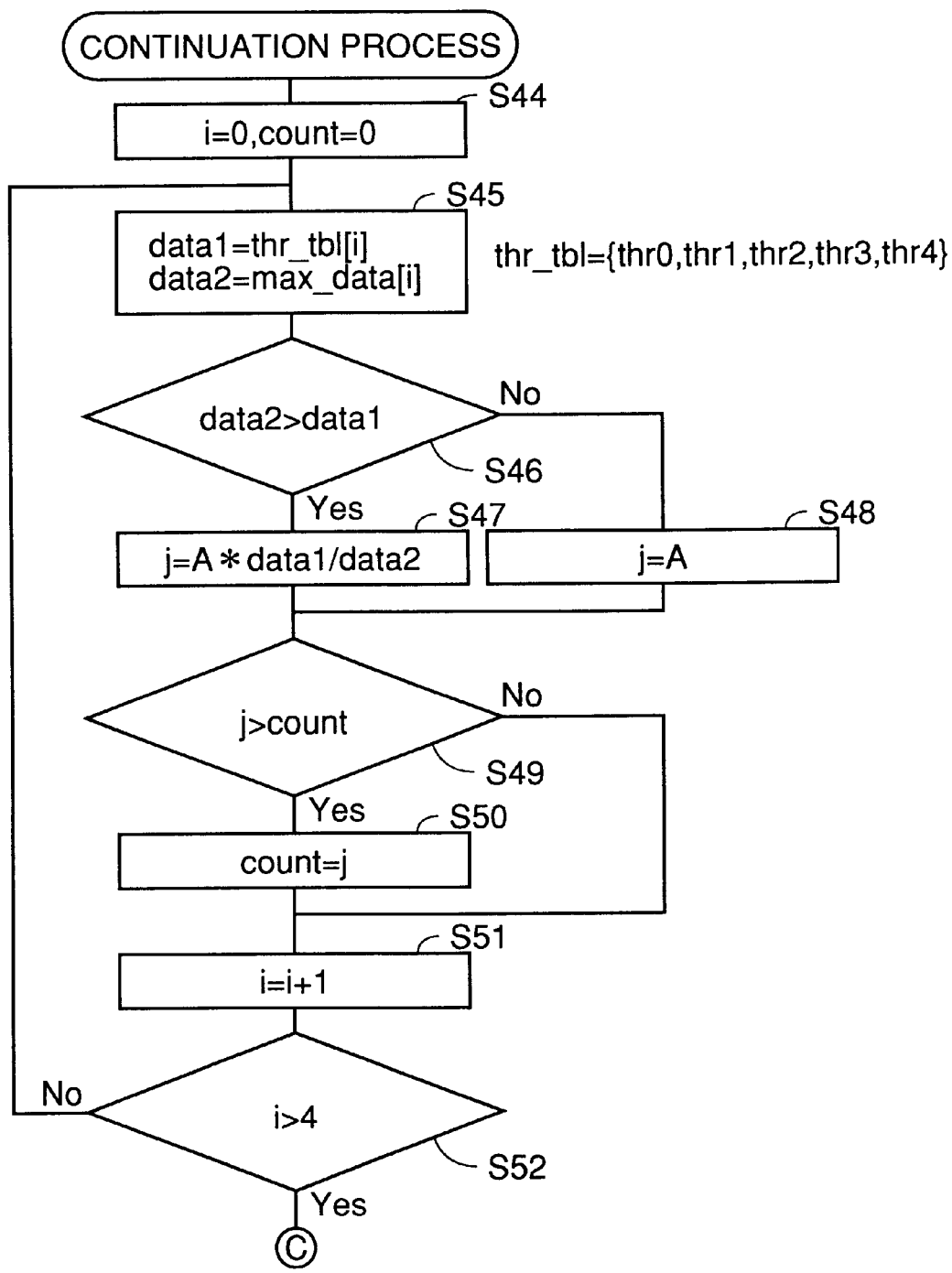
FIG. 7 is a flowchart showing the first half of a continuation process according to an embodiment of the present invention.
Figure 8:
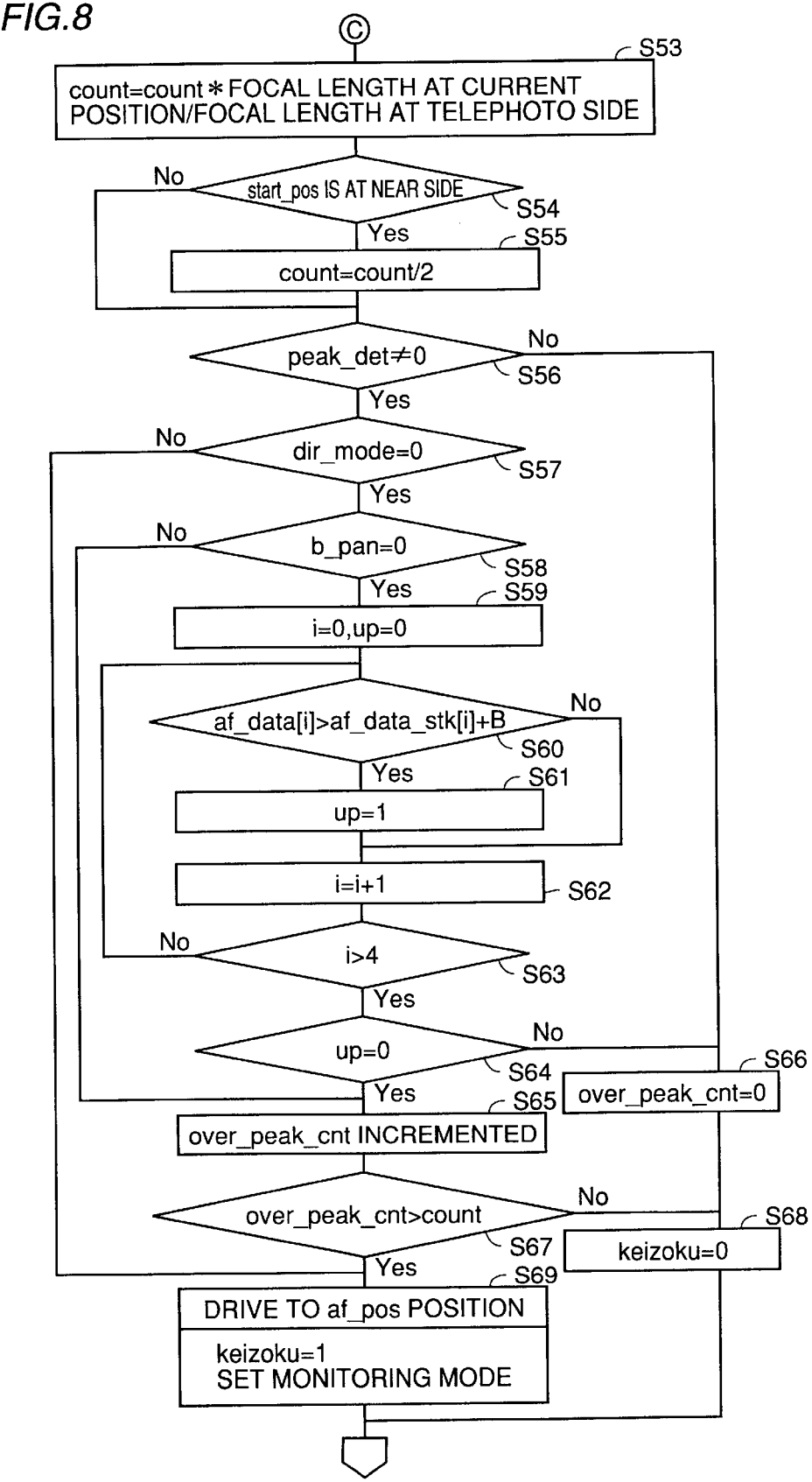
FIG. 8 is a flowchart showing the latter half of the continuation process according to an embodiment of the present invention.

The "continuation process" indicated in step S29 in FIG. 6 will now be described in detail with reference to the flowcharts of FIGS. 7 and 8. First, in step S44, a variable i representing a region number and a variable COUNT representing the number of executions (i.e. continuations) of the AF operation performed by the field unit are cleared.

Subsequently, in step S45, from a threshold table thr_tbl={thr0, thr1, thr2, thr3, thr4} including the threshold values provided respectively corresponding to the regions 0 to 4, threshold thr0 of region 0 is assigned to data1 as thr_tbl [i] and the maximal AF evaluation value max_data [i] of the region 0 is assigned to data2.

Then, if step S46 determines that the maximal value of the AF evaluation value is greater than the threshold value in region 0, a ratio of data1/data2, which is less than 1, multiplied by a predetermined number of times A is calculated as a number of times j (i.e. j<A) in step S47. Thus, the higher the maximal AF evaluation value of data2 is, the smaller the number of times j becomes.

On the other hand, if step S46 determines that the maximal value of the AF evaluation value is no greater than the threshold, the number of times j is set to the constant A in step S48.

Thereafter, step S49 determines whether or not the number of times j is greater than COUNT, and if it is, the number of times j is set as COUNT representing the number of executions of the AF operation.

Subsequently, in step S51, 1 is added to i making i=1, and i=1>4 is not satisfied in step S52 so that the process goes back to step S45, setting data1 and data2 with respect to region i=1.

Subsequently, the processes of steps S45 to S52 described with respect to region i=0 are sequentially performed with respect to regions i=1, 2, 3 and 4.

Meanwhile, the number of times j is greater when data2, i.e. the maximal AF evaluation value is lower, so that the number of times j in a region having the lowest data2 is given a priority in step S49 and is set as COUNT in step S50. In particular, when the maximal AF evaluation value max_data [i] is no greater than threshold thr_tbl [i] corresponding to the region, the number of executions COUNT of the AF operation is set as j=A, as set in step S48.

Thus, according to the continuation process, when the maximal AF evaluation value in any region is no greater than a certain threshold during restarting of the AF operation, the number of executions COUNT of the AF operation is assumed to be maximum (number of times A). Further, even when the maximal AF evaluation value is greater than the certain threshold, an estimation that a subject would be present at the near side by setting the number of executions COUNT of the AF operation greater when the maximal AF evaluation value is smaller, is employed to detect a further maximal value of the focus evaluation value at the near side to focus the subject even closer.

This indicates that, generally, the maximal value of the AF evaluation value for a distant subject will be low when some subject is present at the near side. Therefore, even though the maximal value of the AF evaluation value is once detected, if the value is low, other subjects may possibly be present even closer in the out-of-focus state.

Therefore, the above-described continuation process is made to set the number of executions COUNT of the autofocus operation so as to be able to continue the autofocus operation, by ignoring a hill having a low maximal value of the detected AF evaluation value, during restarting of the autofocus operation.

Subsequently, the number of continuations of the autofocus operation is adjusted in accordance with a depth of field in step S53. That is, as the zoom of the still camera is switched to a telephoto side, the depth of field becomes shallower and the width of variation of the AF evaluation value becomes narrower as indicated by the broken line in FIG. 11A. Thus, the distance between the hills of the AF evaluation value is made wider, so that the number of continuations of the autofocus operation must be increased to capture a subsequent hill. Therefore, step S53 compensates the number of executions for COUNT by multiplying the COUNT set in the preceding step S50 with the focal length at the current position/the focal length of the telephoto.

If, for example, the number of executions of the autofocus operation is set to the reference of a wide angle side, capturing of a subsequent hill of the AF evaluation value will be impossible when set to the telephoto side. Whereas, if the number of executions of the autofocus operation is set to, for example, the reference of the telephoto side, an unnecessary autofocus operation would be executed when set to the wide angle side.

Thus, the continuation process of the present invention is to adjust the number of executions of the autofocus operation in accordance with the set depth of field.

Subsequently, step S54 determines whether or not the starting position start_pos of the autofocus operation is at the near side. Then, if the starting position is at the near side, the number of continuations COUNT of the autofocus operation is reduced to a half in step S55 and the process goes on to step S56, whereas if the position is not at the near side, COUNT is held as it is and the process goes on to step S56.

Thus, the number of continuations of the autofocus operation is adjusted in accordance with whether a position of restarting the autofocus operation is at the near side or not, so that unnecessary autofocus operations can be avoided.

When the autofocus operation is restarted at the near side, the number of executions of the autofocus operation need not be great in order to find the hill of the AF evaluation value assumed to be present closer. Whereas, when the autofocus operation is restarted at a distant side, a certain number of executions of the AF operation is required to find the hill of the AF evaluation value assumed to be present at the closer side.

Therefore, in the continuation process of the present invention, the number of executions of the autofocus operation is adjusted in accordance with the position where the autofocus operation is restarted.

Subsequently, step S56 determines whether or not peak_det is 0. If peak_det is 0, it means that the hill has not yet been detected, so that an over peak counter over_peak_cnt will be 0 in step S66, and a flag keizoku will also be 0 in step S68.

In the flowchart for the multi-AF operation in FIG. 6, if step S30 determines that keizoku is 0, the focus lens is moved by a normal distance AFSTEP through steps S31 to S36. If peak_det is not 0, meaning the hill of the AF evaluation value has already been detected once, then step S57 determines whether or not dir_mode is 0. If dir_mode is 0 in step S57, meaning the focus lens is moved to a closer side, then whether or not b_pan is 0 is determined in step S58.

If b_pan is 0 in step S58, meaning that the camera is not in panning, the process goes on to step S59, and a variable i indicating a region and a flag UP indicating if the AF evaluation value has an increasing tendency are cleared to 0.

Subsequently, step S60 determines whether or not af_data [i] is larger than af_data_stk [i]+B. Here, B is a constant of a certain magnitude, and that af_data [i] is larger means the AF evaluation value in the current field is increased by a certain degree from the AF evaluation value in the previous field. In this case, the flag UP indicating the increasing tendency of the region is set to be 1 in step S61.

Thereafter, in step S62, 1 is added to i making i=1, and i=1>4 is not satisfied in step S63 so that the process goes back to step S60, and subsequently, the steps S60 to S63 described above will sequentially be performed for regions 1, 2, 3 and 4.

As a result, if flag UP is 0 in step S64, that is, no AF evaluation value indicates the increasing tendency in any of the regions 0 to 4, over peak counter over_peak_cnt is incremented in step S65.

Then, it is determined that whether or not the incremented value, i.e. a value indicating a distance by which the focus lens is moved after going over the hill of the AF evaluation value, is greater than the calculated number of continuations COUNT of the AF operation.

If the previous value is not exceeding the calculated number of continuations, flag keizoku is set to be 0 in step S68. In the flowchart for the multi-AF operation in FIG. 6, if step S30 determines that keizoku is 0, the AF operation is executed through steps S31 to S36.

If, on the other hand, the previous value is exceeding the calculated number of continuations in step S67, it is determined that further movement of the focus lens toward the near side would be impossible to help the peak detection, and the process goes on to step S69.

Therefore, in step S69, the focus lens is driven to the position of af_pos, then the flag keizoku is set to be 1, and further the monitoring mode is set.

Back to the flowchart for the multi-AF operation in FIG. 6, if step S30 determines that keizoku is set to be 1, the autofocus operation is terminated through steps S39, and S34 to S36.

If flag UP is 1 in step S64, it can be found that the AF evaluation value is in the increasing tendency in any of the regions. In such a case, over_peak_cnt is set to be 0 in step S66, and flag keizoku is set to be 0 in step S68. Back to the flowchart of the multi-AF operation in FIG. 6, if step S30 determines that keizoku is 0, the AF operation is proceeded through steps S31 to S36.

As such, when the AF evaluation value of any of the regions has detected to be indicating the increase tendency, further movement of the focus lens towards the closer side is carried on. This allows detection of the maximal value of the AF evaluation value if present at the near side, and focusing to the subject at an even nearer side.

While the conventional hill-climbing servo method terminated the AF operation at a position where the hill of the AF evaluation value is once passed over after restarting of the autofocus operation, the continuation process of the present invention is configured to further capture a subsequent hill if a hill of the AF evaluation value is small as described earlier. However, this requires an increased number of executions of the AF operations, whereas the number of executions must be minimum to prevent insecure operations.

Therefore, in the continuation process, the increasing tendency of the AF evaluation value is detected at first, and if the increasing tendency is detected, the AF operation continues to be executed, assuming that the subsequent hill of the AF evaluation value exists. This can avoid insecure operation of the still camera.

In a case where dir_mode is not 0 and the lens position is driven toward the infinite side in step S57, the process proceeds to step S69 and drives the focus lens to the position of af_pos. That is, when driven in the infinite direction after one detection of the hill of the AF evaluation value, the AF operation is immediately terminated.

Thus, when movement of the focus lens toward the near direction could not detect a focus, the driving direction of the focus lens is inverted to the infinite side and the first detected hill of the focus evaluation value is determined as the focus position in step S38.

In a case where the subject is focused at the near side, if, for example, the subject suddenly disappears leaving nothing at the near side, the focus lens position is once driven to the near side in the mean time and then inverted to the infinite side, and the first detected hill of the AF evaluation value is determined as the focus position in accordance with the principle in that the focus position at the near side is dominated to be focused, to terminate the autofocus operation.

Subsequently, if step S58 determines that b_pan is not 0 and the camera is in panning, the process skips steps S59 to S64 and proceeds to step S65, incrementing over_peak_cnt. That is, no determination is made for the increasing tendency of the AF evaluation value when the camera is in panning. This can prevent unnecessary autofocus operations during panning of the camera.

The description of the continuation process (step S29) constituting a part of the multi-AF mode according to the present invention is completed here.

Figure 9:
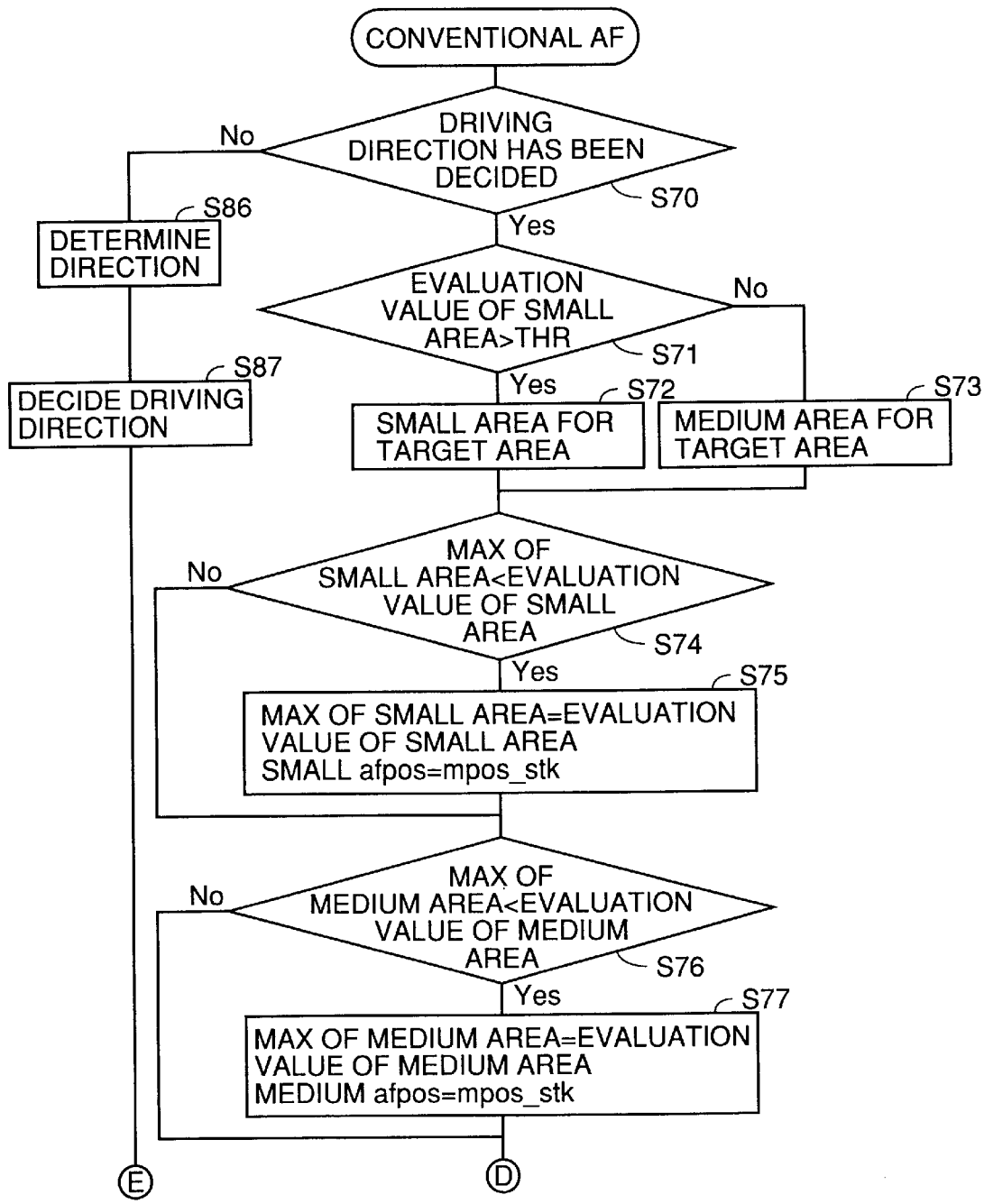
FIG. 9 is a flowchart showing the first half of a process in a conventional AF operation mode used in a part of an embodiment of the present invention.
Figure 10:
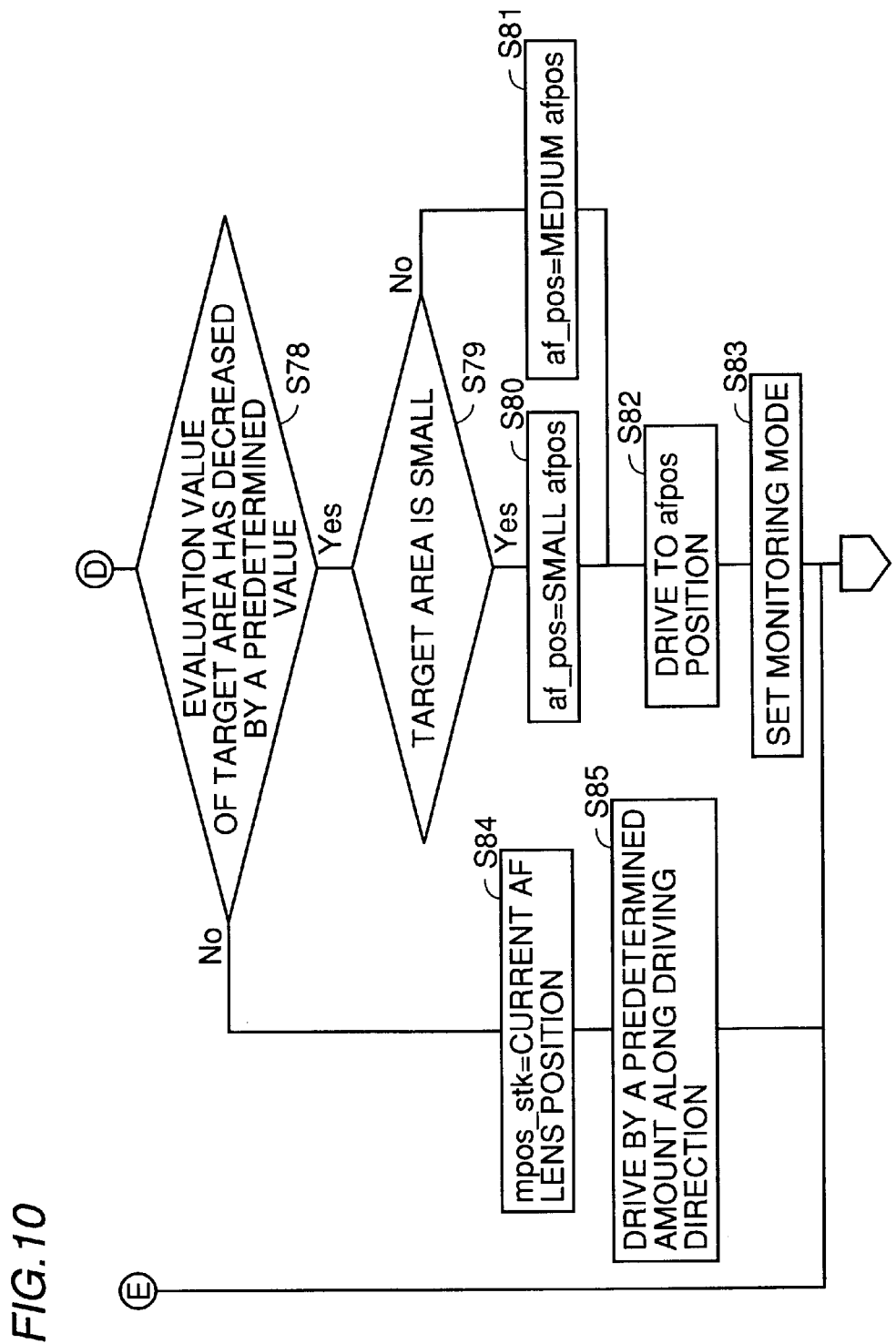
FIG. 10 is a flowchart showing the latter half of the process in the conventional AF operation mode.

The operation in the conventional AF operation mode executed in step S20 in the AF main process of the present invention will now be described below with reference to the flowcharts of FIGS. 9 and 10.

First, step S70 determines whether or not the driving direction of the focus motor has already been decided. If it is determined that the driving direction has not yet been decided, step S86 determines the direction of the focus position whether it is at the distant side or the near side when viewed from the current position of the focus lens, and step S87 decides the driving direction towards the focus position.

On the other hand, if step S70 determines that the driving direction has already been decided, step S71 determines whether or not the AF evaluation value obtained from a small area consisting of e.g. regions 0 and 5 in FIG. 12 is greater than a predetermined evaluation value THR.

The AF evaluation value obtained from the small area is greater than the predetermined evaluation value THR, which indicates that a sufficient magnitude of AF evaluation value is obtained from the small area, then the target area of the autofocus operation is set to the small area in step S72.

On the other hand, if the AF evaluation value obtained from the small area is determined to be smaller than the predetermined evaluation value THR, the target area of the focus operation is expanded, in step S73, to a medium area consisting of regions 0 to 5.

Thereafter, when the target area of the autofocus operation is set to the small area, step S74 determines whether or not the AF evaluation value obtained from the small area is greater than the maximal value of the AF evaluation value in the small area, and if it is greater, in step S75, the maximal AF evaluation value of the small area is updated, and further a lens position af_pos corresponding to the maximal evaluation value in the small area is updated with the focus motor position mpos_stk in a previous field, taking account of a delay associated with the data reading.

Whereas, when the target area of the autofocus operation is set to the medium area, step S76 determines whether or not the AF evaluation value obtained from the medium area is greater than the maximal value of the AF evaluation value in the medium area, and if it is greater, in step S77, the maximal AF evaluation value of the medium area is updated, and the lens position af_pos corresponding to the maximal AF evaluation value in the medium area is updated with the focus motor position mpos_stk in the previous field.

Subsequently, step S78 determines whether or not the AF evaluation value obtained from the target area (small or medium area) has decreased by a predetermined value compared to the previous field. If it is determined that the AF evaluation value has not decreased by that amount, the motor position of the preceding field is updated with the current lens position in step S84, and further in step S85, the focus lens is driven by a predetermined distance in accordance with the determined driving direction to continue the autofocus operation.

If, on the other hand, step S78 determines that the AF evaluation value of the target area has decreased by a predetermined value, when the target area is the small area, the maximal position af_pos of the AF evaluation value is updated in step S79 with a maximal position afpos in the small area obtained in step S75, whereas the maximal position af_pos of the AF evaluation value is updated with a maximal position afpos in the medium area set in step S77 when the target area is determined as the medium area.

Subsequently, in step 82, the focus lens is driven to the position of afpos where the AF evaluation value set in the above step S80 or S81 assumes the maximal value, and in step S83, the autofocus operation is terminated and the monitoring mode begins.

As such, operation of the conventional AF mode (step S20) constituting a part of the AF main process indicated in FIGS. 3 and 4 is executed.

As has been described above, according to the present invention, the autofocus operation based on the variation of the focus evaluation value in a region formed by dividing the focus area into a plurality of independent regions allows the intended subject to be accurately focused, even in such cases where subjects are scattered at different distances, where subjects are off-centered not being present at the center of the imaging region, where the background has a high contrast, and where the subject is small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus having an autofocus function, comprising:

an imaging video signal generator having a focus lens and an imaging device, and providing an imaging video signal;

a driver moving a position of said focus lens relative to said imaging device;

a first focus area setting controller setting a focus area divided into a plurality of regions on an imaging screen;

a first focus evaluation value generator detecting a high frequency component of said imaging video signal at each of said plurality of regions to generate a plurality of focus evaluation values respectively corresponding to said plurality of regions;

a first autofocus controller executing an autofocus operation determining, from positions where said plurality of focus evaluation values respectively assume maximal values, a position where a maximal value can be attained at a closest side to be an in-focus position, and controlling said driver to move the position of said focus lens to the in-focus position; and a first autofocus restarting controller controlling said driver to restart said autofocus operation and to determine an in-focus position while forcibly moving the position of said focus lens from said in-focus position toward a near side, whenever variation occurs in said plurality of focus evaluation values at said in-focus position;

said autofocus operation being executed per certain period of said imaging video signal.

2. The imaging apparatus according to claim 1, wherein said first autofocus restarting controller includes a first detector detecting a position where each of said plurality of focus evaluation values assumes a maximal value while moving the position of said focus lens from said in-focus position toward said near side, and a second detector detecting a position where the focus evaluation value assumes a further maximal value, when any maximal value of said plurality of focus evaluation values is lower than a certain standard value, by ignoring the maximal value and continuing movement of the position of said focus lens toward said near side.

3. The imaging device according to claim 2, wherein said first autofocus restarting controller includes a first adjuster adjusting the number of executions of said autofocus operation to be greater when any maximal value of said plurality of focus evaluation values is lower than a certain standard value.

4. The imaging apparatus according to claim 1, wherein said first autofocus restarting controller further includes a second adjuster adjusting the number of executions of said autofocus operation so as to continue movement of the position of said focus lens toward said near side when detected that the focus evaluation value is smaller than a previously detected maximal value but has an increasing tendency during movement of the position of said focus lens toward said near side.

5. The imaging apparatus according to claim 1, wherein said first autofocus restarting controller further includes a third adjuster adjusting the number of executions of said autofocus operation to decrease the number of executions of said autofocus operation for continuing the movement of the position of said focus lens toward said near side when a depth of field of said imaging video signal generator is set deep, and to increase the number of executions of said autofocus operation for continuing movement of the position of said focus lens toward said near side when a depth of field is set shallow.

6. The imaging apparatus according to claim 1, wherein said first autofocus restarting controller further includes a fourth adjuster adjusting the number of executions of said autofocus operation to decrease the number of executions of said autofocus operation for continuing movement of the position of said focus lens toward said near side when the position of said focus lens is at a near side at the time of restarting said autofocus operation, and to increase the number of executions of said autofocus operation for continuing movement of the position of said focus lens toward said near side when the position of said focus lens is at a distant side at the time of restarting said autofocus operation.

7. The imaging apparatus according to claim 1, further comprising:

a luminance data generator detecting a luminance component at each of said plurality of regions to generate a plurality of luminance data respectively corresponding to said plurality of regions; and said first autofocus restarting controller including a restart stop controller stopping the restarting of said autofocus operation when variation of respective luminance data of said plurality of regions is relatively large.

8. The imaging apparatus according to claim 1, wherein said first autofocus restarting controller includes an autofocus terminating controller inverting a movement direction of the position of said focus lens toward a distant side if no in-focus position can be determined even though the position of said focus lens is moved toward said near side, and determining a position of a maximal value of a focus evaluation value detected first after the inversion as an in-focus position to terminate the autofocus operation.

9. The imaging apparatus according to claim 1, further comprising:

a luminance data generator detecting a luminance component at each of said plurality of regions to generate a plurality of luminance data respectively corresponding to said plurality of regions; and a focus evaluation value controller excluding a focus evaluation value corresponding to a region where high luminance data is present, if any, among said plurality of regions, from a plurality of focus evaluation values to be targets of the autofocus operation by said autofocus controller.

10. The imaging apparatus according to claim 1, wherein said imaging video signal generator selectively supplies an imaging video signal of a still picture or an imaging video signal of a moving picture; and said imaging apparatus further comprises:

a second focus area setting controller setting a plurality of focus areas or a single focus area, undivided into a plurality of regions;

a second focus evaluation value generator detecting a high frequency component of said imaging video signal in said focus area undivided, to generate a focus evaluation value;

a second autofocus controller executing an autofocus operation controlling said driver to determine a position where a focus evaluation value generated by said second focus evaluation value generator assumes a maximal value as an in-focus position and to move the position of said focus lens to the in-focus position;

a second autofocus restarting controller controlling said driver to restart said autofocus operation and to determine an in-focus position, whenever variation occurs in said focus evaluation value at said in-focus position; and a switch controller operating said second focus area setting controller, said second focus evaluation value generator, said second autofocus controller and said second autofocus restarting controller in place of said first focus area setting controller, said first focus evaluation value generator, said first autofocus controller and said first autofocus restarting controller, when an imaging video signal of said moving picture is supplied from said imaging video signal generator.

11. The imaging apparatus according to claim 1, further comprising:

a second focus area setting controller setting a plurality of focus areas or a single focus area, undivided into a plurality of regions;

a second focus evaluation value generator detecting a high frequency component of said imaging video signal in said focus area undivided, to generate a focus evaluation value;

a second autofocus controller executing an autofocus operation controlling said driver to determine a position where a focus evaluation value generated by said second focus evaluation value generator assumes a maximal value as an in-focus position to move the position of said focus lens to the in-focus position;

a second autofocus restarting controller controlling said driver to restart said autofocus operation and to determine an in-focus position, whenever variation occurs in said focus evaluation value at said in-focus position; and a switch controller operating said second focus area setting controller, said second focus evaluation value generator, said second autofocus controller and said second autofocus restarting controller, in place of said first focus area setting controller, said first focus evaluation value generator, said first autofocus controller and said first autofocus restarting controller, when no in-focus position can be detected after restarting of the autofocus operation by said first autofocus restarting controller.

* * * * *